(12) United States Patent
Sakagami

(10) Patent No.: US 7,197,000 B2
(45) Date of Patent: Mar. 27, 2007

(54) METHOD OF GENERATING AN EFFICIENT SEQUENCE OF MULTI-LEVEL RANDOM NUMBERS USED FOR AN INFORMATION RECORDING MEDIUM

(75) Inventor: Koubun Sakagami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 360 days.

(21) Appl. No.: 10/379,586

(22) Filed: Mar. 6, 2003

(65) Prior Publication Data
US 2003/0169666 A1   Sep. 11, 2003

(30) Foreign Application Priority Data
Mar. 8, 2002   (JP)  .............................. 2002-063725
Jan. 31, 2003  (JP)  .............................. 2003-023217

(51) Int. Cl.
G11B 7/24  (2006.01)
(52) U.S. Cl. ................................................. 369/59.24
(58) Field of Classification Search ............ 369/59.24, 369/275.3, 59.25, 47.23, 59.12, 53.21
See application file for complete search history.

(56) References Cited

U.S. PATENT DOCUMENTS

| | | | |
|---|---|---|---|
| 4,161,041 A | 7/1979 | Butler et al. | |
| 5,140,322 A | 8/1992 | Sakagami et al. | |
| 5,142,380 A | 8/1992 | Sakagami et al. | |
| 5,497,194 A | 3/1996 | Sakagami et al. | |
| 6,526,010 B1 * | 2/2003 | Morioka et al. | 369/47.15 |
| 6,587,948 B1 * | 7/2003 | Inazawa et al. | 713/193 |
| 6,665,240 B1 * | 12/2003 | Kobayashi et al. | 369/47.15 |
| 6,816,447 B1 * | 11/2004 | Lee et al. | 369/59.19 |
| 2003/0110444 A1 * | 6/2003 | Sakagami et al. | 715/503 |
| 2003/0112667 A1 * | 6/2003 | Shimizu et al. | 365/200 |
| 2003/0185128 A1 * | 10/2003 | Shoji et al. | 369/59.25 |
| 2004/0037200 A1 * | 2/2004 | Kobayashi et al. | 369/59.24 |
| 2004/0174802 A1 * | 9/2004 | Suzuki | 369/275.3 |

FOREIGN PATENT DOCUMENTS

| | | |
|---|---|---|
| EP | 1 059 630 A1 | 12/2000 |
| EP | 1 158 500 A1 | 11/2001 |
| WO | WO9909546 | 2/1999 |
| WO | WO 01/057857 | 8/2001 |

\* cited by examiner

*Primary Examiner*—Wayne Young
*Assistant Examiner*—Van Pham
(74) *Attorney, Agent, or Firm*—Dickstein Shapiro LLP

(57) ABSTRACT

A method of generating an efficient sequence of "$n^m+m-1$" level random numbers, each sub-sequence of "m" successive random numbers thereof having a different pattern, including the steps of generating a sequence of n-level random numbers based on an initial value, a number being generated at a time, determining whether a pattern of a sub-sequence is "used", if the pattern of the sub-sequence is "used", setting a different value to the initial value, if the pattern of the sub-sequence is not "used", accepting the newly generated number and marking the pattern as "used". All of the steps are repeated until all of "$n^m$" patterns are exhausted. Since the newly generated number is rejected if the pattern of the sub-sequence is "used", the sequence becomes the shortest one of which all of "$n^m$" patterns are exhausted.

10 Claims, 1 Drawing Sheet

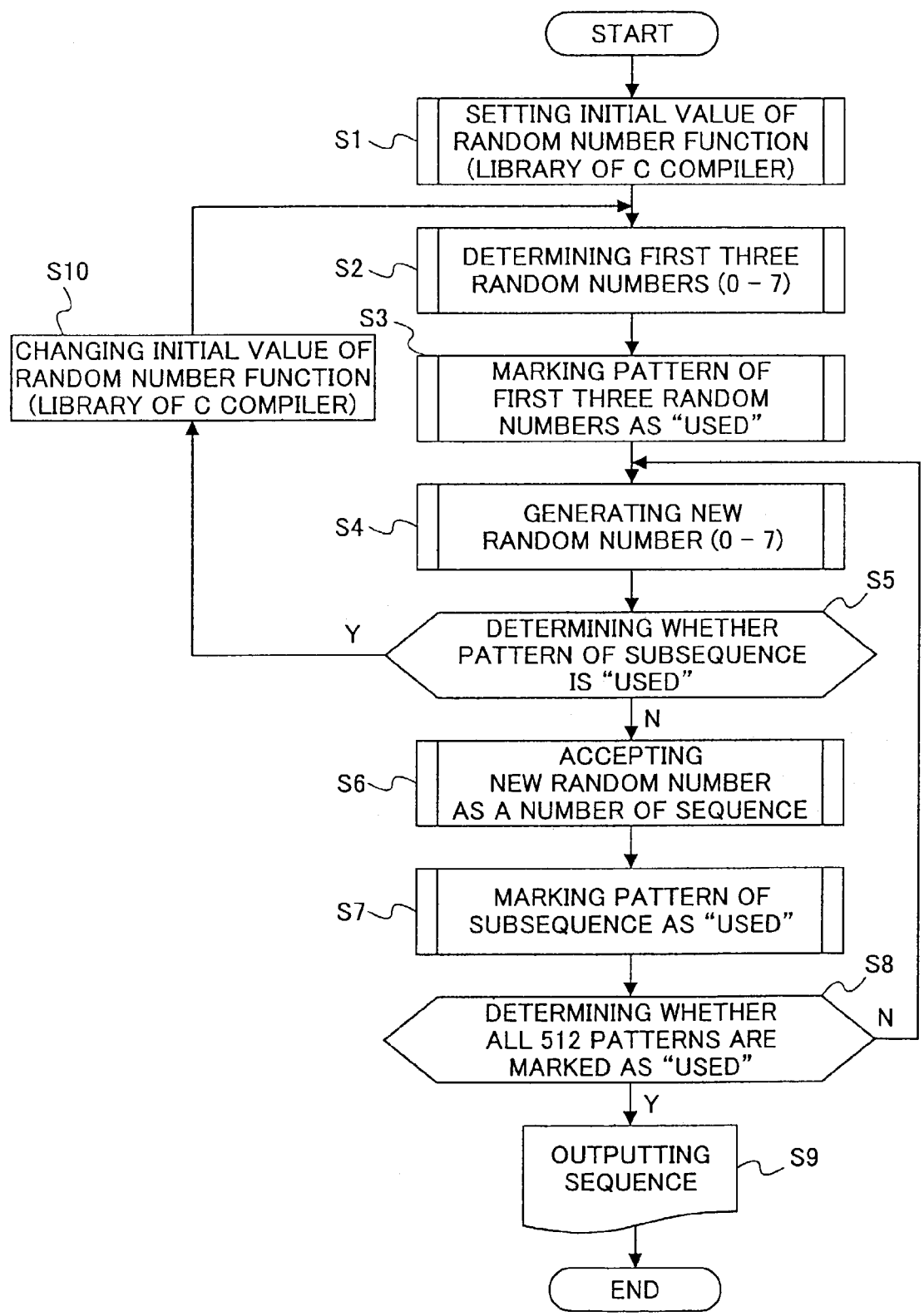

METHOD OF GENERATING AN EFFICIENT SEQUENCE OF MULTI-LEVEL RANDOM NUMBERS USED FOR AN INFORMATION RECORDING MEDIUM

BACKGROUND OF THE INVENTION

1. Field of the Invention

The present invention generally relates to an information recording medium, and more particularly, to an information recording medium that stores an efficient sequence of multi-level random numbers as reference data, a method of generating the efficient sequence of multi-level random numbers, and a computer program for generating the efficient sequence of multi-level random numbers.

2. Description of the Related Art

Optical disk recording apparatuses that can store multi-level data in optical disks are developed. Reference data are sometimes stored in such an optical disk so that the optical disk recording apparatus can calibrate the write strategy and accurately reproduce multi-level data stored in the optical disk.

For example, in the case where each random number is 8-level number and three successive random numbers are considered as a sub-sequence, there are 512 ($=8^3$) different patterns. At least 514 ($=8^3+3-1$) random numbers are required to exhaust all of 512 patterns.

There are many methods to generate a sequence of multi-level random numbers. International Laid-open Patent Application WO01/57857 A1, for example, discloses a method of generating such reference data using a shift register circuit that generates 9-bit maximum-length sequences to calibrate the write strategy of an optical disk recording apparatus. This method can generate a sequence of 8-level random numbers by converting each 9-bit data randomly generated by the shift register circuit into three 3-bit data random numbers. The sequence thus generated can exhaust all of 512 patterns, but it is redundant as it will be described later.

On the other hand, the reference data are also used to reproduce actual multi-level data recorded on an optical disk using pattern recognition method. In this case, the optical disk recording apparatus reproduces the reference data and prepares a table of reproduced signal values. When actual multi-level data stored on the optical disk are reproduced, a signal value reproduced from the actual multi-level data is compared with that of the reference data using the table. The optical disk recording apparatus determines and outputs the pattern of the table of which the reproduced signal value best matches that of the reproduced actual data.

However, in the case of the former conventional art, the sequence includes 512×3=1,536 random numbers. 512 subsequences (each consisting of three consecutive random numbers) can exhaust all of 512 random patterns (of subsequences). However, if three consecutive random numbers starting with the second or third random number of each subsequence are taken into consideration too, the patterns of the three consecutive random numbers appear more than once. Therefore, the sequence of 1,536 random numbers is redundant. Additionally, since the technique uses the shift register circuit for generating maximum-length sequences, the number of multi-levels is limited to the powers of 2 such as 4, 8, and 16.

In the case of the latter conventional art, the redundancy in the reference data also matters. Additionally, because the reference data are not random enough, the reproduced signal may include a particular frequency element that affects the performance of servo mechanism of the optical disk recording apparatus.

SUMMARY OF THE INVENTION

Accordingly, it is a general object of the present invention to provide a novel and useful method of generating a efficient (shortest) sequence of multi-level random numbers, and more particularly, to provide a method of generating a efficient (shortest) sequence of multi-level random numbers in which all patterns of subsequences appear only once but the number of multi-levels is not limited to the powers of 2.

Another object of the present invention is to provide an information recording medium in which the efficient (shortest) sequence of multi-level random numbers is stored as reference data.

To achieve one of the above objects, a method of generating a efficient sequence of "$n^m+m-1$" n-level random numbers, each subsequence of "m" successive random numbers thereof having a different pattern, according to the present invention includes the steps of generating a sequence of n-level random numbers based on an initial value, a number being generated at a time, determining whether a pattern of a sub-sequence of "m" successive random numbers including the newly generated number and "m-1" preceding numbers in an order of the generation thereof is "used", if said pattern of said sub-sequence is "used", setting a different value to said initial value, if said pattern of said sub-sequence is not "used", accepting the newly generated number and marking said pattern as "used", and wherein all of the steps are repeated until all of "$n^m$" patterns of said sub-sequences of "m" successive random numbers are exhausted.

Since the newly generated number is rejected if the pattern of a sub-sequence of "m" successive random numbers is "used", the sequence obtained using this method becomes the shortest sequence that includes "$n^m+m-1$" n-level random numbers of which all of "$n^m$" patterns of the subsequences are. exhausted.

Other objects, features, and advantages of the present invention will become more apparent from the following detailed description when read in conjunction with the accompanying drawing.

BRIEF DESCRIPTION OF THE DRAWINGS

FIG. 1 is a flow chart showing an algorism of a method of generating an efficient sequence of multi-level random numbers according to an embodiment of the present invention.

DETAILED DESCRIPTION OF THE PREFERRED EMBODIMENTS

Preferred embodiments of the present invention will be described by reference to the drawing.

FIG. 1 is a flow chart showing an algorithm of a method of generating an efficient (shortest) sequence of multi-level random numbers according to an embodiment of the present invention. This algorithm is performable by a computer.

In the following detailed description, only a case where n=8 and m=3 will be described. The "n" and "m", however, are not limited to these values, and any positive integers may be set at "n" and "m".

For example, a random number generation function (a library of C compiler) is used to generate a pseudo-random number from 0 to 32767 (=$2^{15}$−1). Using this random number generation function, 8-level random numbers (0–7) can be generated.

A predetermined initial value of the random number generation function is given to the CPU of the computer so that it generates 8-level random numbers (step S1).

Three random numbers (0–7) are generated successively as the first subsequence of random numbers, and the three random numbers are immediately accepted as numbers of the efficient sequence (step S2).

As described above, in the case of three 8-level random numbers constitute a subsequence and the order of the random numbers is taken into consideration, there are $8^3$=512 patterns in total. The pattern corresponding to the subsequence is marked as "used"(step S3).

Another random number (0–7) is generated as a next candidate of a number of the efficient sequence (step S4).

The second and third random numbers in the preceding subsequence and the random number generated in step S4 form a new subsequence. Whether a pattern corresponding to the new subsequence is marked as "used" is determined (step S5).

If the pattern corresponding to the new subsequence is already marked as "used", a different value is given to the random number generation function (a library of C compiler) as the initial value (step S10). The computer returns to step S2 and repeats the above steps.

If the pattern corresponding to the new subsequence is not yet marked as "used", the random number generated in step S4 is accepted as a new number of the efficient sequence (step S6).

The pattern corresponding to the new subsequence is marked as "used" (step S7).

Whether all of 512 patterns are marked as "used" is determined (step S8).

If there remain patterns that are not marked as "used", the computer returns to step S4 and repeats the above steps.

If all of 512 patterns are already marked as "used", the computer stops generating a random number and outputs the efficient sequence consisting of 514 (=$8^3$+3−1) 8-level random numbers (step S9) Then, the computer exits the process showed in FIG. 1.

According to the above algorithm, 8-level random numbers ranging 0–7 are generated one by one and arranged in the order of generation. An ordered set including two preceding random numbers as the first and second numbers in the order of generation thereof and a newly generated random number as the third and last number is considered as a subsequence of random numbers.

For example, the first subsequence includes the first, second, and third random numbers; the second subsequence includes the second, third, and fourth random numbers; and the third subsequence includes the third, fourth, and fifth random numbers.

The newly generated random number is accepted as a new number of the efficient sequence, and the pattern corresponding to the subsequence is marked as "used" unless the pattern is already marked as "used". There are 512 (=$8^3$) patterns in total.

Once a pattern that is already marked as "used" appears, the newly generated random number is abandoned, and the initial value of the random number generation function is changed to a different value.

Using the new initial value, the above steps are repeated until all of 512 patterns are exhausted, and the total number of random numbers accepted as numbers of the efficient sequence reaches 514 (=$8^3$+3−1). The 514 random numbers is the shortest sequence in which each pattern of a subsequence appears only once.

In the case where three random numbers "7", "5", and "6" are generated in this order, for example, "756" becomes the first subsequence. The pattern "756" is marked as "used".

Then, the forth random number, "2", is generated, for example. "562" becomes the second subsequence. Since the pattern "562" is not yet marked as "used", the fourth random number "2" is accepted as a new number of the efficient (shortest) sequence. The pattern "562" is marked as "used".

Likewise, another random number is generated, and a new subsequence including the last two accepted random numbers and the newly generated random number is formed. Whether the pattern corresponding to the new subsequence is already marked as "used" is determined. If the pattern is not yet marked as "used", the newly generated random number is accepted as a new number of the efficient (shortest) sequence. Then, the pattern corresponding to the new subsequence is marked as "used".

If the pattern corresponding to the new subsequence is already marked as "used", the newly generated random number and those that will be generated by the random number generation function based on the initial value are abandoned. The initial value is changed so that the function generates a new sequence of random numbers, and the above steps are repeated.

Whether all 512 patterns are marked as "used" is determined. If there still remain patterns that are not marked as "used", the computer generates the next random number (0–7), and determines whether the next random number can be accepted as a number of the efficient sequence.

If the same pattern does not appear twice or more and all the 512 patterns are marked as "used", the sequence generated by the computer becomes the efficient (shortest) sequence includes 514 random numbers where a pattern corresponding to each subsequence including three successive random numbers starting every (first) random number appears only once.

Then, the computer outputs the efficient sequence and exits the process.

Here are some examples of the efficient (shortest) sequence generated based on the method according to the embodiment of the present invention.

FIRST EXAMPLE

75626633105434332772716566625523654507354235253627302514720101347635356040527016133345754431467061574620533056364741664440776050471214321145616773724140665774530436732632076177154012265532301415674350623360630035571136342103713071446102465051602162173403163750274022254132215313115517104426244106722202325641164250151126142765260172135702671747361175152001110757622373120335100705500060344522430651257337646005726437447042400454777002064046315030324513703660742272317072521234124755653464555466766127524204176753775

SECOND EXAMPLE

44057061236231147024005355414100303370406415322207526767403447722156115166206564271252506363734020265754043054534232452001361505276524464572032743165461374214017300716174167753750144562513124122756726160665317135106270152162604630745503542263201634602

3711120560366055764717002556502304512175142435731571450060736000476146670377735661021273213306757467155515434544134335234113011051172723536733326664621164436552257747553364076631031437242643233472563507050417633132530277077624737601262246517710107210444204254744

THIRD EXAMPLE

2574777156454273047674441602122026067001750647225554570375612016751154043712142423410022711105347103640060310753343114510440563512377046216435013741775467172453027526221300355755353736772705141552054452102042673762766074015720763274566411655601011313577420330613320620055072661713261170663372151624757321734034551344362503014701246163614630323057161065325240236316652723241365474642236045024460505226465041447317432224333140637071434254127765764421125176153126515000735430773356562634666235231525676004070253667257025366725

As showed in the above examples, each pattern of sub-sequence (three successive random numbers) appears only once. Accordingly, these sequences are not redundant, and are efficient and the shortest.

Next, an information recording medium in which the above efficient sequence of multi-level random numbers is stored therein will be described. The information recording medium stores therein a sequence of "$n^m+m-1$" n-level (an integer, $n \geq 2$) random numbers in which, among $n^m$ different patterns, each pattern of "m"(an integer, $m \geq 2$) successive random numbers appears only once.

In the following detailed description, an optical disk is described as an embodiment of the information recording medium. However, it is noted that the present invention may be applied to any information recording medium other than the optical disk.

The efficient sequence of multi-level random numbers stored in an optical disk can be reproduced as reference data to provide a table that is used for pattern recognition.

The position in the recording region of the optical disk in which the efficient sequence of multi-level random numbers are stored as reference data will be described.

(1) In the case where the efficient sequence of multi-level random numbers is stored at inner radius of the recording region of the optical disk In many cases, an optical disk drive starts reading and writing from the inner radius. Since the inner radius of the optical disk is less vulnerable to bending and distortion of the optical disk, reading and writing operation at the inner radius is relatively more stable than that at the outer radius. Accordingly, if the efficient sequence is stored at the inner radius in the recording region of the optical disk, it is possible to provide a reliable table. Because this table needs to be provided at the initial stage of a reading operation, if the efficient sequence is stored at the inner radius, the distance for which the optical pickup of the optical disk drive needs to move in the radial direction can be reduced. Accordingly, the time required to start the reading operation can be reduced.

As described above, because the efficient sequence of multi-level random numbers is stored at the inner radius of the optical disk, the reference data are not affected by the bending and distortion of the optical disk, and as a result, the table becomes reliable. Additionally, since the distance for which the optical pickup of the optical disk drive needs to move in the radial direction is reduced, the time required to initialize the reading operation can be reduced.

(2) In the case where the efficient sequence of multi-level random numbers is stored at both inner radius and outer radius of the recording region of the optical disk.

The signal reproduced by the optical disk drive depends on the position where the optical disk is accessing due to spatial dispersion of recording material provided on the optical disk. The quality of signal from the inner radius and the outer radius sometimes change. Accordingly, it is beneficial to store the reference data at both the inner radius and the outer radius and prepare the table by averaging the signals obtained from the inner radius and the outer radius.

As described above, since the efficient sequence (reference data) is stored at both the inner radius and the outer radius, it is possible to provide a table that reflects the spatial change in the reproduction signal depending on the position in the recording region and improve the reliability of reproduced actual data.

(3) In the case where the efficient sequence is stored at the inner radius, the middle radius, and the outer radius in the recording region of the optical disk The table obtained based on the reference data stored at the middle radius is used to reproduce the actual data stored between the inner radius and the middle radius. The table obtained based on the reference data stored at the inner radius and the outer radius is used to reproduce the actual data stored between the middle radius and the outer radius.

In order to reflect the change in signal depending on the position in the recording region, it is beneficial to provide reference data at the middle radius and generate the table by averaging the reproduced signal values obtained from the reference data at the middle radius and the reference data at the outer radius.

As described above, there are reference data stored in the inner radius, in the middle radius, and in the outer radius in the recording region on the optical disk, the change in the signal depending on the position in the recording region is reflected more accurately.

(4) In the case where the efficient sequences is stored at the inner radius, at the outer radius, and at plural positions between the inner radius and the outer radius provided in the recording region of the optical disk, each position being spaced from one another by a predetermined distance The table obtained based on the reference data of the inner radius is used to reproduce the actual data stored in the recording region from the inner radius on the way to the middle radius; the table obtained based on the reference data of the middle radius is used to reproduce the actual data stored in the recording region in which the middle radius is included; and the table obtained based on the reference data of the outer radius is used to reproduce the actual data stored in the recording region outer than the recording region in which the middle radius is included.

It is beneficial to divide the recording region of the optical disk into plural donut-shaped recording regions and record the efficient sequence as reference data in each donut-shaped recording region so that a table can be generated for each donut-shaped recording region for accurate reproduction of actual data.

If the efficient sequence is stored at the inner radius, at the outer radius, and at plural positions between the inner radius and the outer radius provided in the recording region of the optical disk, each spaced from one another by a predetermined distance, the change in reproduced signal depending on the position can be reflected to the table more precisely.

(5) In the case where the efficient sequence is stored in every track making a circuit of the optical disk The efficient sequence (reference data) may be recorded in every track making a circuit of the optical disk so that the change in reproduced signal can be reflected to the table more precisely.

(6) In the case where the efficient sequence is attached to each of predetermined amount of actual data and recorded in the recording region of the optical disk The efficient sequence may be attached to each of predetermined amount of actual data and recorded in the recording region of the optical disk as reference data. For example, the reference data may be recorded in each sector with actual data of 32 KB and error detection and/or error correction codes. In the case where actual data are stored by a sector as the unit in an optical disk using plural optical disk drives, the actual data thus recorded with the reference data can be reproduced without problem by any optical disk drive.

In summary, as described above, the method according to an embodiment of the present invention can generate an efficient sequence of multi-level random numbers that includes the fewest random numbers in which subsequences exhaust all patterns and the value of each random number is not limited to the powers of 2.

The preferred embodiments of the present invention are described above. The present invention is not limited to these embodiments, but various variations and modifications may be made without departing from the scope of the present invention.

This patent application is based on Japanese priority patent applications No. 2002-063725 filed on Mar. 8, 2002, and No. 2003-023217 file on Jan. 31, 2003, the entire contents of which are hereby incorporated by reference.

What is claimed is:

1. A method of providing a computer readable medium containing reference data, said reference data being comprised of an efficient sequence of "$n^m+m-1$" n-level random numbers, each sub-sequence of "m" successive random numbers thereof having a different pattern, said method comprising the steps of:
    generating a sequence of n-level random numbers based on an initial value, a number being generated at a time;
    determining whether a pattern of a sub-sequence of "m" successive random numbers including the newly generated number and "m−1" preceding numbers in an order of the generation thereof is "used",
    if said pattern of said sub-sequence is "used", setting a different value to said initial value;
    if said pattern of said sub-sequence is not "used", accepting the newly generated number and marking said pattern as "used";
    wherein all of the steps are repeated until all of "$n^m$" patterns of said sub-sequences of "m" successive random numbers are exhausted; and
    recording said n-level random numbers of said efficient sequence of said n-level random numbers as said reference data on said computer readable medium.

2. A method of operating a computer comprising:
    executing a computer program that causes the computer to generate an efficient sequence of "$n^m+m-1$" n-level random numbers, each sub-sequence of "m" successive random numbers thereof having a different pattern, wherein executing comprises the steps of:
    generating a sequence of n-level random numbers based on an initial value, a number being generated at a time;
    determining whether a pattern of a subsequence of "m" successive random numbers including the newly generated number and "m−1" preceding numbers in an order of the generation thereof is "used";
    if said pattern of said sub-sequence is "used", setting a different value to said initial value;
    if said pattern of said sub-sequence is not "used", accepting the newly generated number and marking said pattern as "used";
    wherein all of the steps are repeated until all of "$n^m$" patterns of said sub-sequences of "m" successive random numbers are exhausted; and
    causing said n-level random numbers of said efficient sequence of said n-level random numbers to be recorded as reference data on a computer readable medium.

3. A computer readable recording medium in which a computer program is stored, the computer program for causing a computer to generate an efficient sequence of "$n^m+m-1$" n-level random numbers, each sub-sequence of "m" successive random numbers thereof having a different pattern, by:
    generating a sequence of n-level random numbers based on an initial value, a number being generated at a time;
    determining whether a pattern of a subsequence of "m" successive random numbers including the newly generated number and "m−1" preceding numbers in an order of the generation thereof is "used";
    if said pattern of said sub-sequence is "used", setting a different value to said initial value;
    if said pattern of said sub-sequence is not "used", accepting the newly generated number and marking said pattern as "used"; and
    wherein all of the steps are repeated until all of "$n^m$" patterns of said sub-sequences of "m" successive random numbers are exhausted.

4. An information recording medium, wherein an efficient sequence of "$n^m+m-1$" n-level random numbers is recorded as data in a disk-shaped recording region of the information recording medium, the efficient sequence being arranged to be read from said medium and reproduced by an information processing system as reference data, said efficient sequence comprising a plurality of sub-sequences of "m" random numbers, each sub-sequence having a different pattern.

5. The information recording medium as claimed in claim 4, wherein the efficient sequence is recorded at an inner radius of said disk-shaped recording region.

6. The information recording medium as claimed in claim 4, wherein the efficient sequence is recorded at an inner radius and an outer radius of said disk-shaped recording region.

7. The information recording medium as claimed in claim 4, wherein the efficient sequence is recorded at an inner radius, a middle radius, and an outer radius of said disk-shaped recording region.

8. The information recording medium as claimed in claim 4, wherein the efficient sequence is recorded at an inner radius, an outer radius, and at plural positions between said inner radius and said outer radius, each position being equally distant from one another, of said disk-shaped recording region.

9. The information recording medium as claimed in claim 4, wherein the efficient sequence is recorded in every track making a circuit of said disk-shaped recording region.

10. The information recording medium as claimed in claim 4, wherein the efficient sequence is attached to each of predetermined amount of actual data and recorded in said disk-shaped recording region of said information recording apparatus.

* * * * *